US008707780B2

United States Patent
Bachmann et al.

(12) United States Patent
(10) Patent No.: US 8,707,780 B2
(45) Date of Patent: Apr. 29, 2014

(54) FLUID MIXTURE METERING DEVICE INCLUDING AN ARCUATE PATH ON THE PERIPHERY OF THE IMPELLER WHEEL

(75) Inventors: Rene Bachmann, Radeberg (DE); Kersten Grosse, Radebeul (DE); Johann Gunnesch, Waldenburg (DE); Thomas Morchel, Finsterwalde (DE); Daniel Rammer, Schoenborn (DE)

(73) Assignee: Buerkert Werke GmbH, Ingelfingen (DE)

( * ) Notice: Subject to any disclaimer, the term of this patent is extended or adjusted under 35 U.S.C. 154(b) by 649 days.

(21) Appl. No.: 12/866,041

(22) PCT Filed: Feb. 4, 2009

(86) PCT No.: PCT/EP2009/000739
§ 371 (c)(1),
(2), (4) Date: Dec. 8, 2010

(87) PCT Pub. No.: WO2009/103418
PCT Pub. Date: Aug. 27, 2009

(65) Prior Publication Data
US 2011/0083502 A1 Apr. 14, 2011

(30) Foreign Application Priority Data
Feb. 18, 2008 (DE) ..................... 20 2008 002 218 U

(51) Int. Cl.
G01F 11/26 (2006.01)
G01F 1/05 (2006.01)

(52) U.S. Cl.
USPC .......................................... 73/203; 73/861.79

(58) Field of Classification Search
None
See application file for complete search history.

(56) References Cited

U.S. PATENT DOCUMENTS

| 2,078,057 | A | | 4/1937 | Chirca | |
|---|---|---|---|---|---|
| 2,362,778 | A | | 11/1944 | Steen | |
| 4,173,144 | A | | 11/1979 | Pounder | |
| 4,179,924 | A | * | 12/1979 | Tomczak | 73/861.79 |
| 5,368,273 | A | * | 11/1994 | Dante | 251/122 |
| 5,388,455 | A | * | 2/1995 | Hamby et al. | 73/152.29 |
| 5,549,010 | A | * | 8/1996 | Park et al. | 73/861.79 |
| 5,766,487 | A | * | 6/1998 | Park | 210/739 |
| 6,170,345 | B1 | * | 1/2001 | Kerner | 73/866.5 |
| 6,381,549 | B1 | * | 4/2002 | Smith | 702/54 |
| 7,426,875 | B1 | * | 9/2008 | McMillan | 73/861.79 |
| 2003/0233860 | A1 | * | 12/2003 | Deane et al. | 73/1.16 |
| 2005/0156066 | A1 | * | 7/2005 | Ivans | 239/723 |
| 2005/0272891 | A1 | * | 12/2005 | Fouarge et al. | 526/943 |
| 2006/0131442 | A1 | * | 6/2006 | Ivans | 239/104 |
| 2008/0195331 | A1 | * | 8/2008 | Schrittenlacher | 702/45 |

FOREIGN PATENT DOCUMENTS

| DE | 34 42 358 A1 | 9/1985 |
|---|---|---|
| EP | 0 080 168 B1 | 8/1985 |
| EP | 0 184 084 A2 | 6/1986 |
| GB | 2 055 348 A | 3/1981 |
| WO | WO-92/01980 A1 | 2/1992 |

* cited by examiner

*Primary Examiner* — Harshad R Patel
(74) *Attorney, Agent, or Firm* — Tarolli, Sundheim, Covell & Tummino LLP

(57) ABSTRACT

The device for metering fluid mixtures, in particular liquids containing a gas such as carbon dioxide, includes a flow sensor, a metering valve, and a controller that drives the metering valve as a function of a set point and of the flow rate measured. The flow sensor has an impeller wheel having a horizontal axis, the fluid mixture being guided on an arcuate path on the periphery of the impeller wheel, the path being directed from bottom to top. Despite the presence of gas, a precise metering is achieved.

7 Claims, 4 Drawing Sheets

(Prior Art)

FLUID MIXTURE METERING DEVICE INCLUDING AN ARCUATE PATH ON THE PERIPHERY OF THE IMPELLER WHEEL

FIELD OF THE INVENTION

The present invention relates to a device for metering fluid mixtures, preferably of liquids or of a liquid and a gas such as, e.g., carbon dioxide.

BACKGROUND OF THE INVENTION

Metering devices are required in the beverage or food industries, for example.

Both a desired liquid volume and a defined filling speed are required to be precisely adjustable here.

It is known to measure flow rates with the aid of sensors such as, e.g., an impeller wheel.

When the fluid to be metered is a mixture of liquid and gas, the running properties of the sensor are impaired by the gas and, thereby, the measured values are falsified, which results in that a desired amount of fluid can not be reliably metered.

SUMMARY OF THE INVENTION

The device according to the invention is intended to allow a batch filling to be realized within a preset time. But a continuous flow control is also possible.

The metering device indicated in the appended claims allows a precise measurement of the flow rate even in the presence of gas.

A special geometry of the upstream and downstream flow angle of the impeller wheel mounted on a horizontal axis causes the freedom from gas thereof even in case of low filling speeds. The gas not dissolved in the medium collects above the liquid and remains in the sensor area only for a short time.

A taper of the upstream flow channel has the additional effect that the fluid to be metered experiences an acceleration. This is of advantage in the measurement in the lower flow region.

BRIEF DESCRIPTION OF THE DRAWINGS

Details of the invention will be apparent from the description below and from the accompanying drawings, to which reference is had and in which.

DESCRIPTION OF PREFERRED EMBODIMENTS

Figure 2:
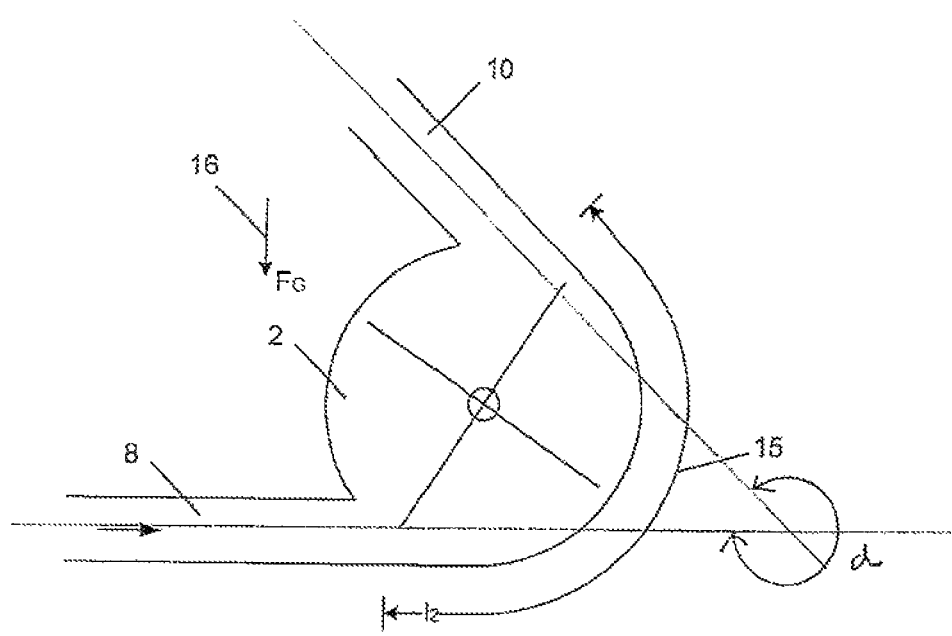
FIG. 2 shows a sectional drawing of a fluid channel guidance according to the invention and of a sensor.
Figure 3:
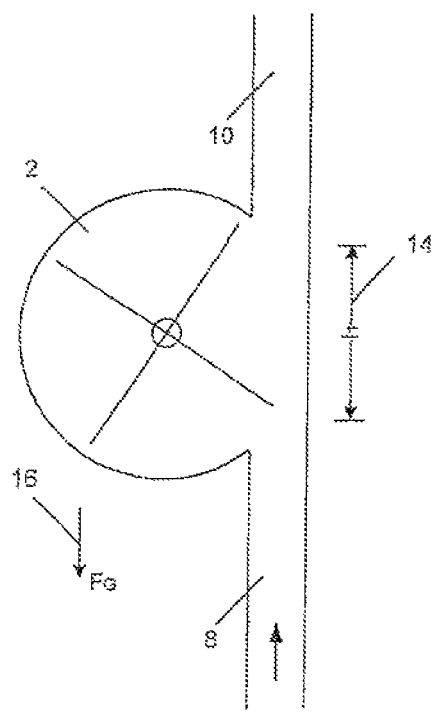
FIG. 3 shows a sectional drawing of a fluid channel guidance and of a sensor according to the prior art.
Figure 4:
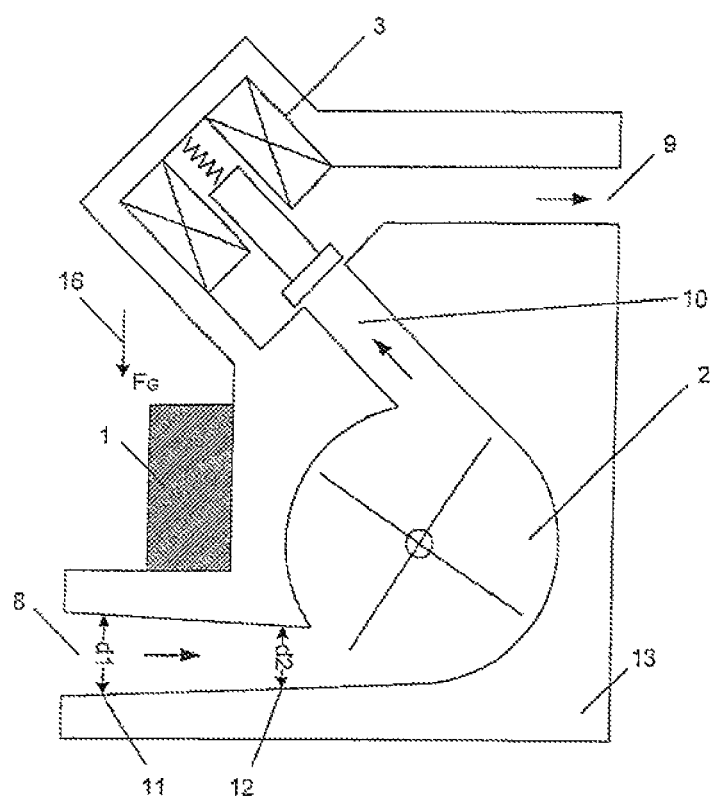
FIG. 4 shows a sectional drawing of a metering device according to the invention.

In the drawing FIGS. 2, 3, and 4, the weight 16 drawn in by means of an arrow there shows the preferred spatial arrangement of the device or part thereof.

Figure 1:
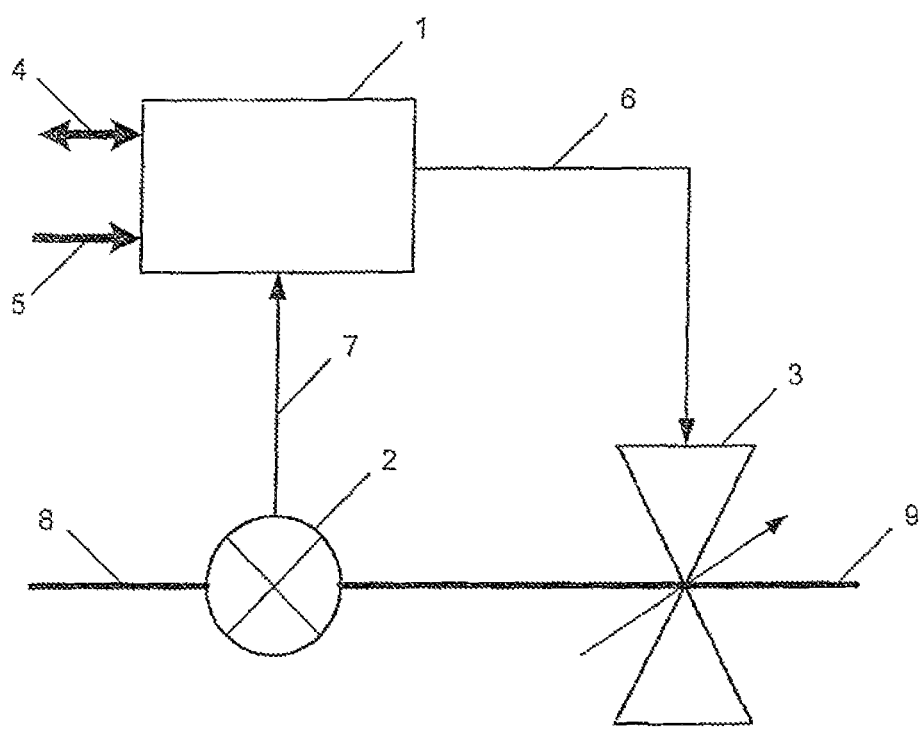
FIG. 1 shows a block diagram of a metering unit according to the prior art.

As shown in FIG. 1, a fluid to be metered is directed in a known manner through the fluidic inlet 8 via the flow sensor 2 to the proportional valve 3. The proportional valve is driven by means of the drive signal 6 with the aid of the control electronics 1.

The control electronics 1 is connected to the voltage supply 5 and communicates with the user via an interface 4. Based on the sensor signal 7 of the flow sensor 2, the proportional valve 3 receives its drive signal and the desired amount of the medium reaches the fluidic outlet 9.

FIG. 2 illustrates a sectional drawing of a fluid channel guidance according to the invention and of a sensor. In comparison therewith, FIG. 3 shows a sectional drawing of a fluid channel guidance and of a sensor according to the prior art.

The fluid to be metered flows from the inlet 8 via the impeller wheel 2 to the outlet 10.

Unlike in known devices according to FIG. 3, in the configuration shown in FIG. 2 the fluid channel does not extend linearly also in the area of the sensor, but, in accordance with the geometry thereof, it has the shape of a graduated circle, at least in a part of the sensor area. The angle $\alpha$ defined by the central axes of the intake channel 8 and the outflow channel 10 is distinctly greater than 180° and, in the present case, amounts to about 315°. As is apparent from FIGS. 2 and 3, this causes the fluid entrainment path in the device according to the invention to be distinctly longer than in a conventional metering device. In this way, any disturbing gas in the sensor area is constantly transported away from this area in the direction 10 towards the proportional valve 3.

The channel geometry illustrated, having a horizontal channel section that is as short as possible in the area of the flow sensor prevents gas from being able to accumulate in this area. An important aspect in this connection is the horizontal axis of the impeller wheel and the flow path that leads from bottom to top.

FIG. 4 shows a sectional drawing of a complete metering system 13 according to the invention. It has a control electronics 1 integrated therein, which allows a compact construction.

A taper of the fluidic inlet channel 8 has an additional favorable effect on the flow of the medium to be metered. The diameter of the fluid channel is reduced from d1 in the region of the inlet 8 at 11 to d2 near the sensor at 12. The proportional valve 3 is arranged such that its central axis constitutes the prolongation of the central axis of the fluidic channel 10 in the longitudinal direction between the sensor and the valve.

The invention claimed is:

1. A device for metering liquids containing a gas, comprising a flow sensor, a metering valve, and an electronic controller that drives the metering valve as a function of a set point and of the flow rate measured, wherein the flow sensor includes an impeller wheel having a horizontal axis, the liquid being guided on an arcuate path on the periphery of the impeller wheel, the path being directed from bottom to top with respect to gravity ($F_G$), and wherein the liquid is guided towards the arcuate path via a horizontal intake channel and guided from the arcuate path towards the metering valve via an outflow channel that is angled in relation to the intake channel, wherein the arcuate path extends over an angle greater than approximately 300° on the periphery of the impeller wheel, the angle being defined by the axes of the intake channel and the outflow channel.

2. The device according to claim 1, wherein the metering valve is arranged at the end of the outflow channel.

3. The device according to claim 1, wherein the metering valve is a proportional valve.

4. The device according to claim 1, wherein the electronic controller is combined with the flow sensor and the metering valve to form a structural unit.

5. The device according to claim 1, wherein the impeller wheel is freely rotatable.

6. The device according to claim 1, wherein the intake channel is tapered towards the arcuate path.

7. A device for metering liquids containing a gas, comprising a flow sensor, a metering valve, and an electronic controller that drives the metering valve as a function of a set point and of the flow rate measured, wherein the flow sensor includes an impeller wheel having a horizontal axis, the liquid being guided on an arcuate path on the periphery of the impeller wheel, the path being directed from bottom to top with respect to gravity ($F_G$), wherein the liquid is guided towards the arcuate path via a horizontal intake channel and guided from the arcuate path towards the metering valve via an outflow channel that is angled in relation to the intake channel, wherein the arcuate path extends over an angle greater than approximately 300° on the periphery of the impeller wheel, the angle being defined by the axes of the intake channel and the outflow channel, wherein the intake channel is oriented horizontally with respect to gravity ($F_G$) and is tapered so that its diameter decreases towards the arcuate path.

\* \* \* \* \*